US010740622B2

(12) United States Patent
Peterson et al.

(10) Patent No.: US 10,740,622 B2
(45) Date of Patent: Aug. 11, 2020

(54) METHOD OF THEFT DETECTION AND PREVENTION

(71) Applicants: Vaughn Peterson, Provo, UT (US); Jacob Christensen, Syracuse, UT (US); Steven Malone, Manti, UT (US)

(72) Inventors: Vaughn Peterson, Provo, UT (US); Jacob Christensen, Syracuse, UT (US); Steven Malone, Manti, UT (US)

(73) Assignee: Hall Labs LLC, Provo, UT (US)

( * ) Notice: Subject to any disclaimer, the term of this patent is extended or adjusted under 35 U.S.C. 154(b) by 248 days.

(21) Appl. No.: 15/467,105

(22) Filed: Mar. 23, 2017

(65) Prior Publication Data

US 2018/0276480 A1 Sep. 27, 2018

(51) Int. Cl.
*G06K 9/00* (2006.01)
*G08B 13/196* (2006.01)

(52) U.S. Cl.
CPC ..... *G06K 9/00771* (2013.01); *G06K 9/00369* (2013.01); *G08B 13/19602* (2013.01)

(58) Field of Classification Search
CPC ............ G06K 9/00771; G06K 9/00369; G06T 7/248; G06T 2207/30196; G06T 2207/10048; G06T 2207/30232; G08B 13/19602
See application file for complete search history.

(56) References Cited

U.S. PATENT DOCUMENTS

| 2004/0183679 | A1* | 9/2004 | Paximadis | G08B 13/19 340/567 |
| 2007/0237201 | A1* | 10/2007 | Ignatowicz | G01M 3/002 374/7 |
| 2013/0048855 | A1* | 2/2013 | Abreo | H04N 5/33 250/330 |
| 2016/0253885 | A1* | 9/2016 | Nassar | G06F 16/9537 340/572.1 |
| 2016/0295208 | A1* | 10/2016 | Beall | G06T 7/80 |
| 2016/0321506 | A1* | 11/2016 | Fridental | G06K 9/00771 |

* cited by examiner

*Primary Examiner* — Dave Czekaj
*Assistant Examiner* — Berteau Joisil

(57) ABSTRACT

A method of theft prevention and detection includes detecting movement of warehoused product by a person using one or more cameras; obtaining a first thermal image of a body of the person, with the one or more cameras, while the person is handling or moving the warehoused product; storing a physical size or shape of the warehoused product; obtaining a second thermal image of the body of the person, with the one or more cameras, subsequent to the obtaining of the first thermal image; determining thermal intensity differences by comparing the first thermal image of the body of the person to the second thermal image of the body of the person; detecting potential theft when the thermal intensity differences correlate to the physical size or shape of the warehoused product; and informing the person that the potential theft has been detected.

19 Claims, 10 Drawing Sheets

METHOD OF THEFT DETECTION AND PREVENTION

BACKGROUND

Field of the Invention

The present invention relates to detection and prevention of product theft in a brick-and-mortar store.

Background of the Invention

Theft is the cause of millions of dollar of loss each year for many retailers. Theft prevention technologies that detect theft are usually focused on or associated with a customer or shopper leaving a store. Such technologies usually rely on exit gates to detect electromagnetic signals indicating a theft is happening. When caught, a thief is usually embarrassed or starts to run away leading to an awkward moment for the store and the thief. An automated theft deterrent system does not currently exist which detects theft at or near the initial thieving of a product, before the thief attempts to leave a store.

SUMMARY

A method of theft prevention and detection includes detecting movement of warehoused product by a person using one or more cameras; obtaining a first thermal image of a body of the person, with the one or more cameras, while the person is handling or moving the warehoused product; storing a physical size or shape of the warehoused product; obtaining a second thermal image of the body of the person, with the one or more cameras, subsequent to the obtaining of the first thermal image; determining thermal intensity differences by comparing the first thermal image of the body of the person to the second thermal image of the body of the person; detecting potential theft when the thermal intensity differences correlate to the physical size or shape of the warehoused product; and informing the person that the potential theft has been detected.

The one or more cameras may include still image cameras, video cameras, thermographic cameras, infrared cameras, forward looking infrared cameras, or a combination thereof. A thermal marker may be attached to the warehoused product. A defined camera location or a defined pixel grouping of an optical sensor in one of the one or more cameras may be used to determine a location of the person. Detecting movement may be based, in part, on movement of the thermal marker attached to the warehoused product. One or more cameras may identify a type or kind of the warehoused product being moved. A type or kind of warehoused product may be identified by a product barcode attached to the warehoused product. A thermal marker attached to the warehoused product may be a thermal barcode. A thermal barcode may comprise machine readable thermal markings identifiable by a thermal camera, a standard camera, or a standard barcode reader. Storing of the physical size or shape of the warehoused product may be a result of the identifying the type or kind of the warehoused product being moved. Storing of the physical size or shape of the warehoused product may be a result of storing a digitized image of the warehoused product as the warehoused product is being moved. Obtaining a second thermal image of the body of the person may be between 2 seconds and 30 seconds after the first thermal image is obtained. Obtaining a second thermal image of the body of the person may be between 2 seconds and 30 seconds after movement of the warehoused product. A second thermal image may be selectively chosen from a plurality of thermal images taken subsequent to the first thermal image. A location of the person may be reported to a device of an employee who is associated with the warehoused product. Informing the person may be accomplished by a physical notification attached to a product transportation device. Informing the person may be accomplished by an employee, associated with the warehoused product, speaking to the person. Informing the person may be accomplished by sending a text message to a mobile device of the person. A second thermal image may be selectively chosen based on a position of the warehoused product intersecting, overlaying, or covering a portion of a thermal image of the person's body. A first thermal image and A second thermal image may be obtained by comparing frames of digital thermal images of the person's body until an intensity difference of the first thermal image of the person's body and the second thermal image of the person's body is obtained.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
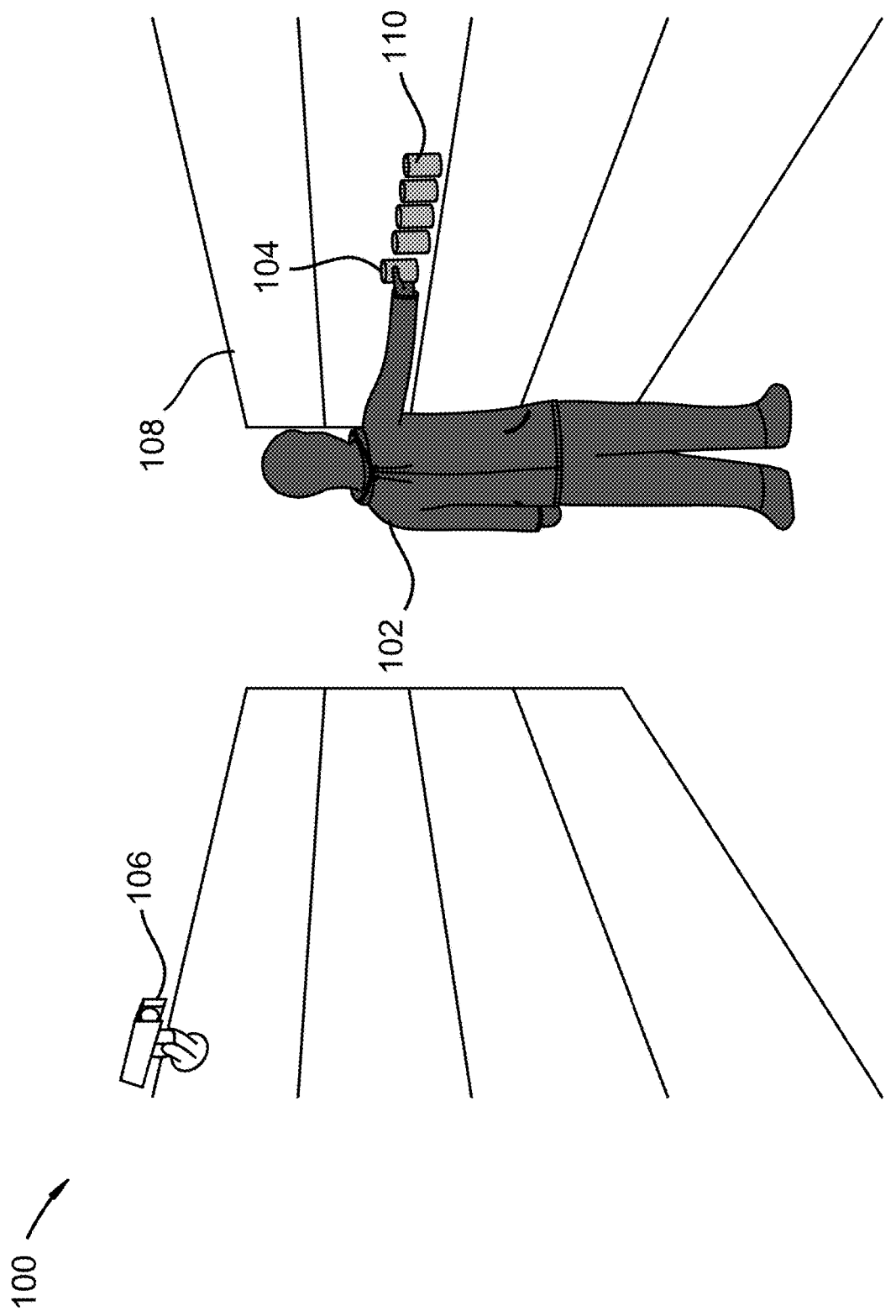
FIG. 1 shows a perspective view of a person holding a warehoused product in accordance with an embodiment of the invention.

FIG. 1 shows a perspective view 100 of a person holding a warehoused product in accordance with an embodiment of the invention. One or more store cameras 106 may track a customer/person 102 and determine that the customer/person 102 has removed a warehoused product 104 from an isle shelf 108 of a store or warehouse. One or more cameras 106 may comprise one or more of: still image cameras, video cameras, thermographic cameras, infrared cameras, forward looking infrared cameras, motion sensors, or a combination thereof. One or more or the one or more cameras may employ thermal imaging in addition to poly chromatic images/video to track the customer and any items removed from a shelf. One or more thermal imaging cameras 106 may detect and discriminate a product's thermal image 104 (shown in light gray) from a customer's thermal image 102 (shown in dark grey). Temperature differences between objects in a field-of-view of a thermographic camera appear with different colors or shades which directly correlate to the temperatures of the objects. Items with similar temperatures have similar colors or shading. A person, 102, shown has a relatively uniform temperature profile shown by the uniform grey coloring. Warehoused products 104/110, have a relatively uniform temperature profile but are at a different temperature (ambient) compared to customer/person 102 at or near body temperature. As person/customer 102 handles or moves warehoused product 104, one or more thermal cameras 106 may take one or more thermal images or may start taking thermal video frames. A movement of product 104 may be detected by one or more cameras 106 and trigger the one or more cameras to start taking thermal images or frames of a body of person 102 to obtain a first thermal image. One or more cameras 106 may be used as a motion sensor/detector or a motion sensor may be co-located with one or more cameras 106 and trigger thermal image capture of a body of person 102.

Figure 2:
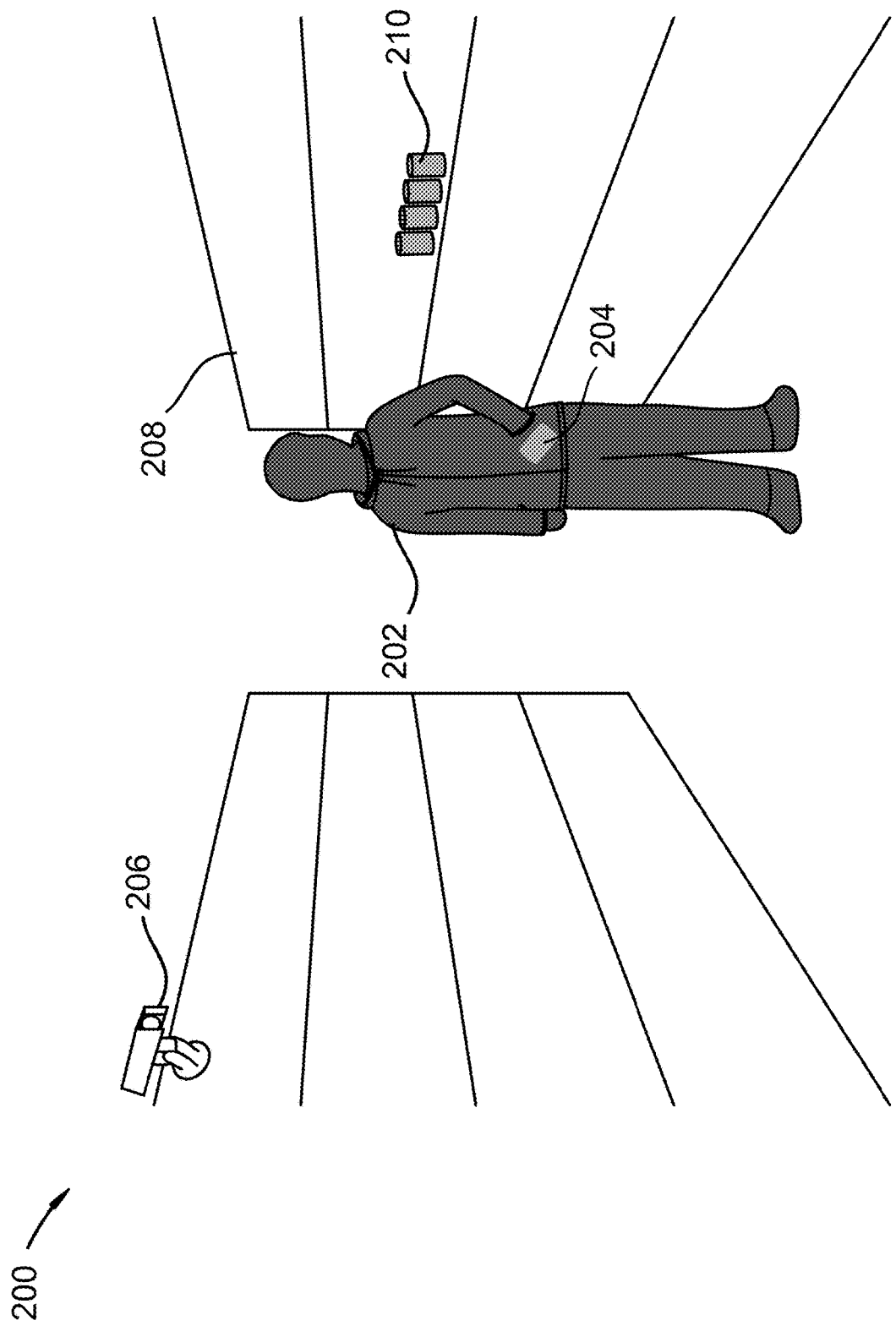
FIG. 2 shows a perspective view of a person pocketing a warehoused product in accordance with an embodiment of the invention.

FIG. 2 shows a perspective view 200 of a person pocketing a warehoused product in accordance with an embodiment of the invention. One or more cameras 206 which may include one or more camera systems, one or more computers, one or more wireless transmitters, one or more wireless receivers, one or more networks, may be used to detect a customer/person with pocketed product 204. Product 204 may include one or more products removed from a shelf or display 208. The one or more cameras 206 may employ thermal imaging in addition to poly chromatic images to track the customer and any items removed from a shelf. One or more cameras 106 may comprise one or more of: still image cameras, video cameras, thermographic cameras, infrared cameras, forward looking infrared cameras, motion sensors, or a combination thereof. One or more or the one or more cameras may employ thermal imaging in addition to poly chromatic images/video to track the customer and any items removed from a shelf. One or more thermal imaging cameras 206 may detect and discriminate a product's thermal image 204 (shown in light gray) from a customer's thermal image 202 (shown in dark grey). Temperature differences between objects in a field-of-view of a thermographic camera appear with different colors or shades which directly correlate to the temperatures of the objects. Items with similar temperatures have similar colors or shading. A person, 202, shown has a relatively uniform temperature profile shown by the uniform grey coloring except for the thermal image of the product 204 shown in light grey. Warehoused product 204, has a relatively uniform temperature profile but is at a different temperature (ambient) compared to customer/person 202 being at or near body temperature. A difference of two thermal images may reveal a product item that has been recently pocketed. A first thermal image of a body of person 202 shown in FIG. 1 as 102 may be taken as a product is handled or moved. At a subsequent time, a second thermal image is taken and compared to the first thermal image revealing a difference in intensity (shown in FIG. 9). A first thermal image is important because a product item brought in the store by the customer, such as a cold soda, may have been in their pocked before a pocketed item was placed in the same pocket. A comparison of a first thermal image to a second thermal image is also important to detect a potential theft. Obtaining a first and second thermal image at or near a time of pocketing a product is also important because of possible temperature equalization resulting in an undetectable thermal profile difference between products pocketed and a temperature of a person's body. The first and second thermal images may be taken within 30 seconds of a movement of a product item. As person/customer 202 handles or moves warehoused product 204, one or more thermal cameras 206 may take one or more thermal images or may start taking thermal video frames. A movement of product 204 may be detected by one or more cameras 206 and trigger the one or more cameras to start taking thermal images or frames of a body of person 202 in order to obtain a first thermal image. A second thermal image may be obtained by comparing a first thermal image to video frames or images taken after or subsequent to the first thermal images and detecting images intensity differences about, overlaid, or superimposed onto a body of a person handling the product. If an intensity difference if found, the two images may be chosen as a first and second thermal image. Both the first and second thermal images may be taken within a 30 second interval of each other. One or more cameras 206 may be used as a motion sensor/detector or a motion sensor may be co-located with one or more cameras 206 and trigger thermal image capture of a body of person 202. An image of the customer with a customer location superimposed in the image or connected to the image may be sent to an employee's mobile device by means of wired or wireless communications. The image may be sent by text message, by email, by instant messaging, or directly through a custom program application. The machine vision may track customer's movements in real-time while a customer moves inside of a store. The camera system 206 may use a defined camera location or a defined pixel grouping to determine a customer location identifier. One or more cameras 206 may be used and a camera may be assigned to a particular area, isle or region within a store. If only one camera is used, pixel groupings of a camera's optical sensor may be related to isles, regions, and/or areas of a store. Cameras may use thermal imaging in addition to optical image recognition. Machine vision may also identify the one or more items for purchase using barcodes, lettering, or dimensional constraints of a product. If a customer's location changes, an updated image may be sent to the employee with an updated location attached to the image. An employee may deliver a product transportation device, container, cart or basket to a customer's current location and ask the customer to "please use a product transportation container instead of your clothing to transport product to be purchased" as a method of preventing theft. A customer may be notified of an arrival of the product transportation device either by the employee, a text message, a display screen on the product transportation device, or by an audio store loud speaker broadcast.

Figure 3:
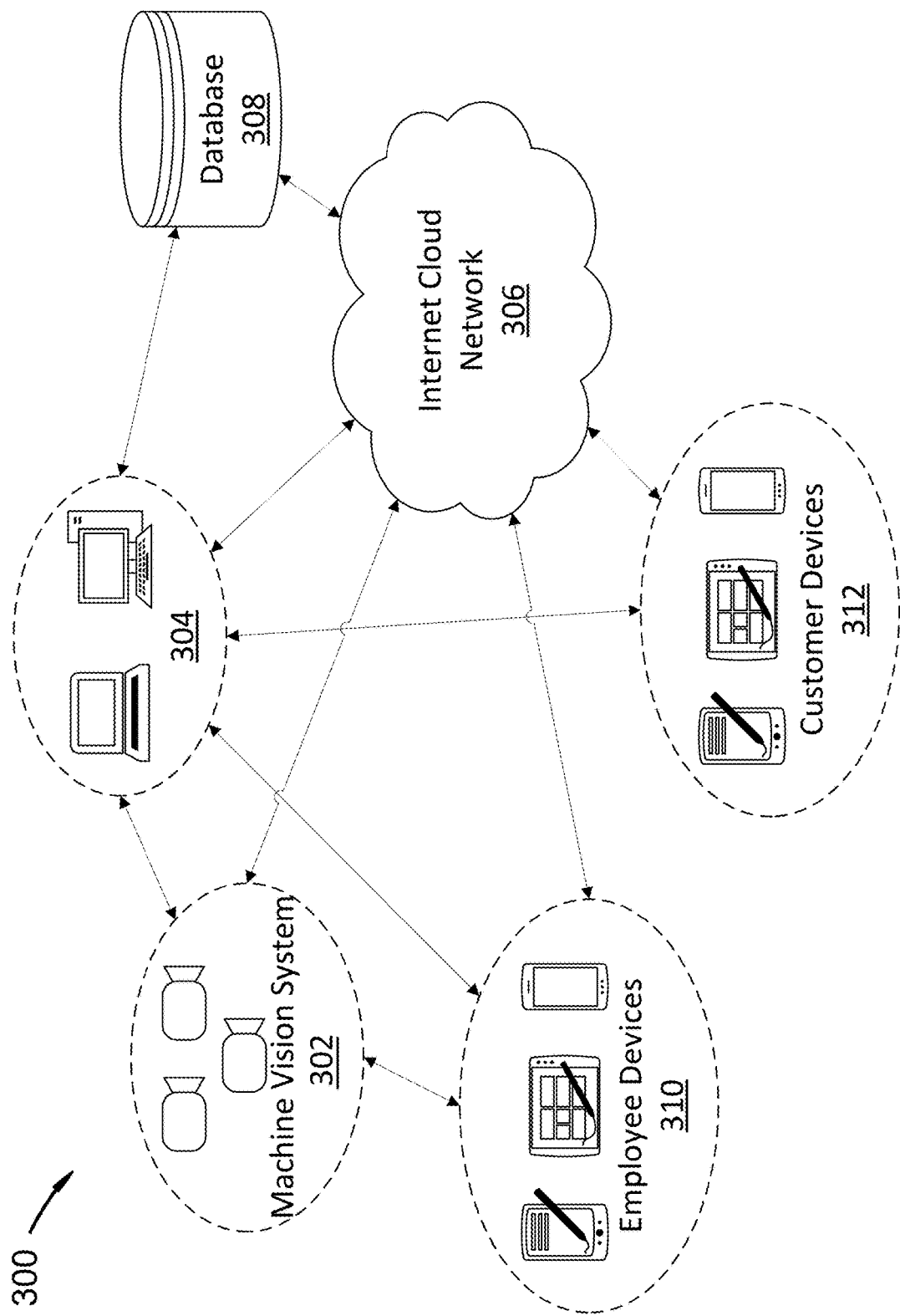
FIG. 3 shows a diagram depicting system devices and methods of theft detection and prevention in accordance with an embodiment of the invention.

FIG. 3 shows a diagram depicting devices and methods of theft detection and prevention in accordance with an embodiment of the invention. System 300 may include machine vision system 302, one or more computers or processors 304, a cloud based wide area network 306, databases 308 including database servers, customer devices 312, and employee devices 310 which all may communicate wirelessly and/or by wire. Machine vision system 302 may include one or more cameras used to detect customers of a brick-and-mortar store carrying one or more items beneath clothing, as described earlier. The machine vision may use a defined camera location or a defined pixel grouping to determine a customer location identifier. One or more cameras may be used and a camera may be assigned to a particular area, isle or region within a store. If only one camera is used, pixel groupings of a camera's optical sensor may be related to isles, regions, and/or areas of a store. Cameras may use thermal imaging in addition to optical image recognition. The machine vision may also identify the one or more items for purchase using a barcode, lettering, or dimensional constraints. One or more computers 302 may be connected wirelessly or by wire to each camera of vision system 302. One or more cameras may employ thermal imaging in addition to poly chromatic images to track the customer and any items removed from a shelf. Thermal imaging cameras may detect and discriminate a products thermal image from a thermal image of a person attempting to steal the product, as described in relation to FIGS. 1 and 2. Computers 304 may provide processing and data storage allowing tracking and identification of customers and items being carried by the customers. Computers 304 may detect customers carrying items by comparing thermal image data of customers without hidden items to thermal image data of customers carrying items hidden under clothing. Alternatively, or additionally, products may be detected by cameras 302 and computers 304 that are removed from off of shelves in order to trigger a first and second thermal image of a person's body to be to be taken. If the products being tracked by vision system 302 are never placed under a person's clothing, a thermal intensity of an image of the product will not change and no potential theft will be triggered. This may be verified as an employee receives an image at an employee device and confirms whether the customer is hiding a product under clothing. Computers 304 may form a local area network within a company with multiple locations with a shared database. Wide area network 306 may include the Internet, cloud based servers and databases, which may be local or remote from a store using vision system 302. Computers 304 may transmit and receive data over a local area network or a wide area network. Digital image processing and tracking may be performed on a cloud based server or on local computers. An electronic image of the customer may taken by the machine vision system 302/304 looking at or handling specific items to be purchased. The image obtained is overlaid with a location of the customer using computers 304 or cloud processing 306 and the image is sent to an employee device 310. The employee may determine, by looking at the picture/thermal image, that the customer has placed product beneath clothing. An employee may leave a shopping cart in a location close to the customer and an electronic device 312 connected to the shopping cart may identify the customer and invite them to place the items in the basket. The electronic device may audibly and/or visibly invite the customer to use the provided cart. A location of the shopping cart, with the attached electronic customer device, may be associated with a customer profile by machine vision system 302 and/or computers 304. A global positioning system within customer device 312 may be used to report location information to network 304 or network 306 in order to associate a shopping cart with a customer profile. The customer, when presented a shopping cart, may take the shopping cart and decide to remove items under clothing the customer originally planned on thieving. The electronic customer device 312 on the shopping cart may contain images of the customer placing items under their clothing.

Figure 4:
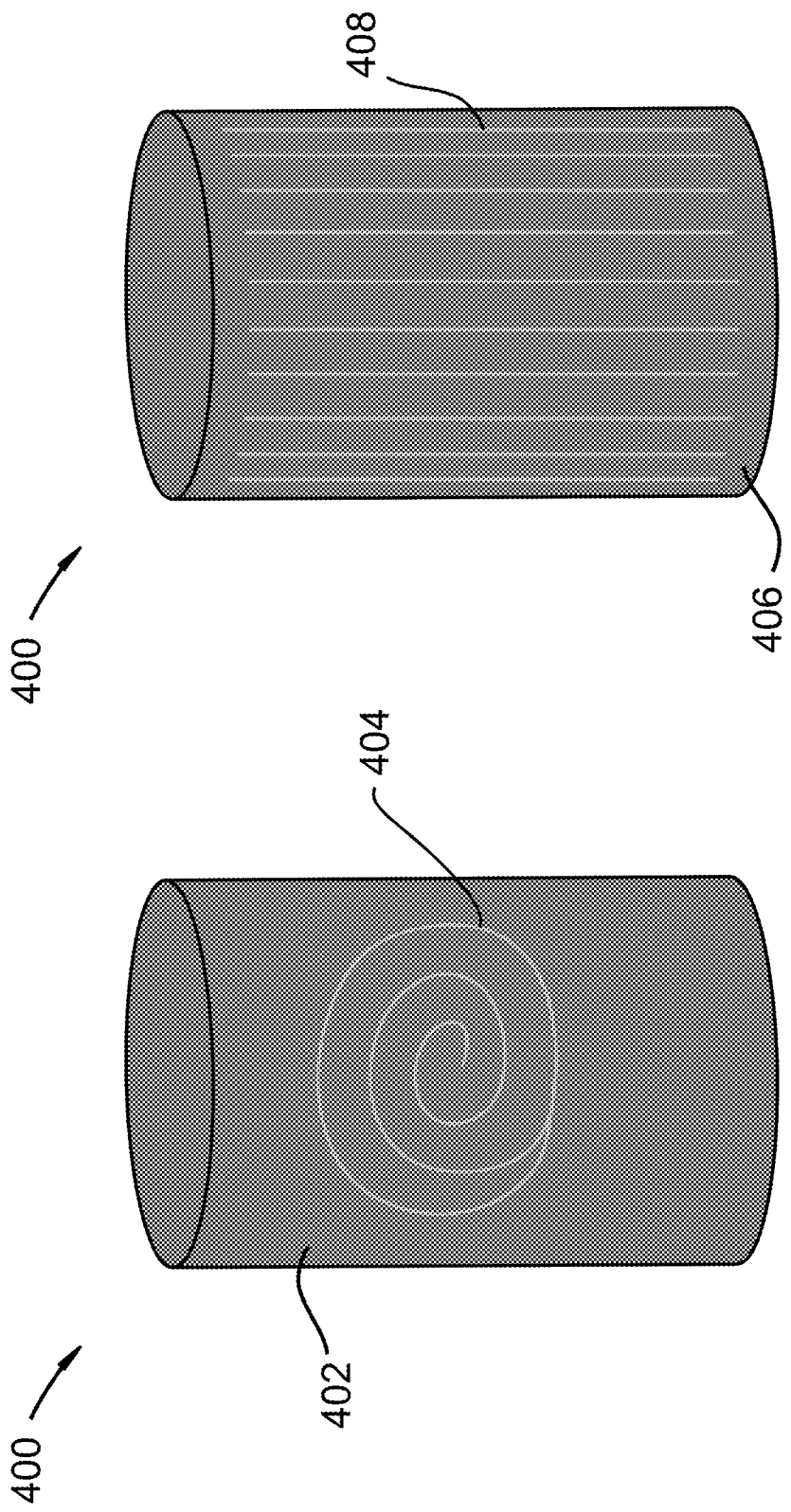
FIGS. 4A and 4B show side views of products with thermal markers in accordance with an embodiment of the invention.

FIGS. 4A and 4B are front views 400 of products 402/406 with thermal markers 404/408 in accordance with an embodiment of the invention. Products 402/406 contain thermal markers 404 and 408. Thermal markers 404/408 may be thermal barcodes or other machine recognizable indicia. Thermal markers may include structures configured to reflect infrared light/heat or absorb infrared light/heat such as: thermally reflective tapes, thermally reflective ink, thermally reflective materials, thermally absorptive materials, and/or combinations thereof.

Figure 5:
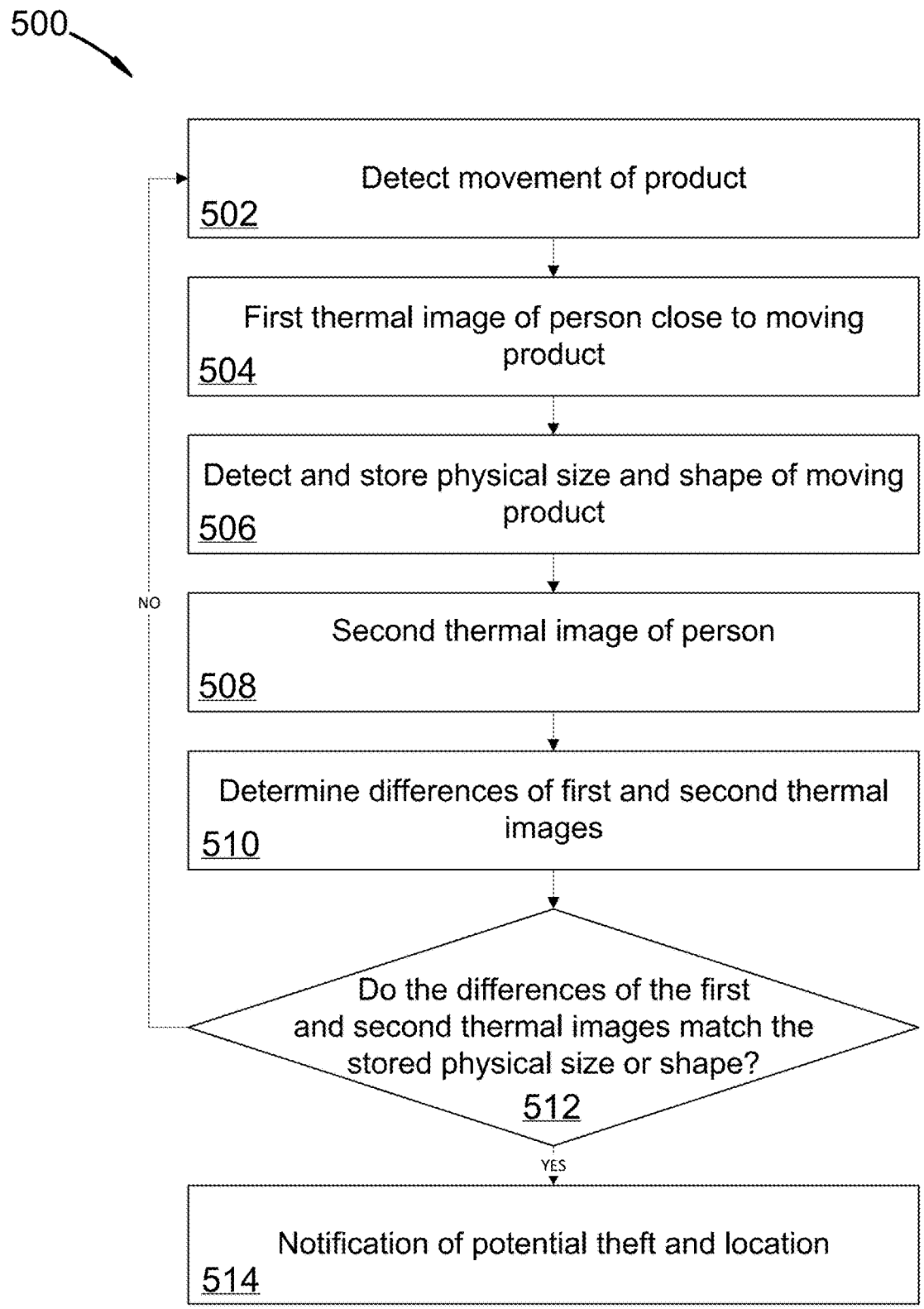
FIG. 5 shows a process flow chart in accordance with an embodiment of the invention.

FIG. 5 shows a process flow chart in accordance with an embodiment of the invention. At step 502 a vision system detects a person moving a warehoused product. One or more cameras take a first thermal image 504 of a body of a person handling or moving the warehoused product. A physical size and/or shape of the warehoused product is stored 506. A second thermal image is obtained subsequent or after the first thermal image is taken 508. A computer system with a program, performs digital image processing to determine differences in image intensities of the first and second thermal images 510. At step 512, a determination is made if the differences in the first thermal image compared to the second thermal image correlate to a stored physical size or shape of the product moved 512. If a match is found a notification of theft including a location and images to an electronic device. The electronic device may be an employee device, a store loud speaker, a shopping cart device, or a device of the person who is concealing the product 514.

Figure 6:
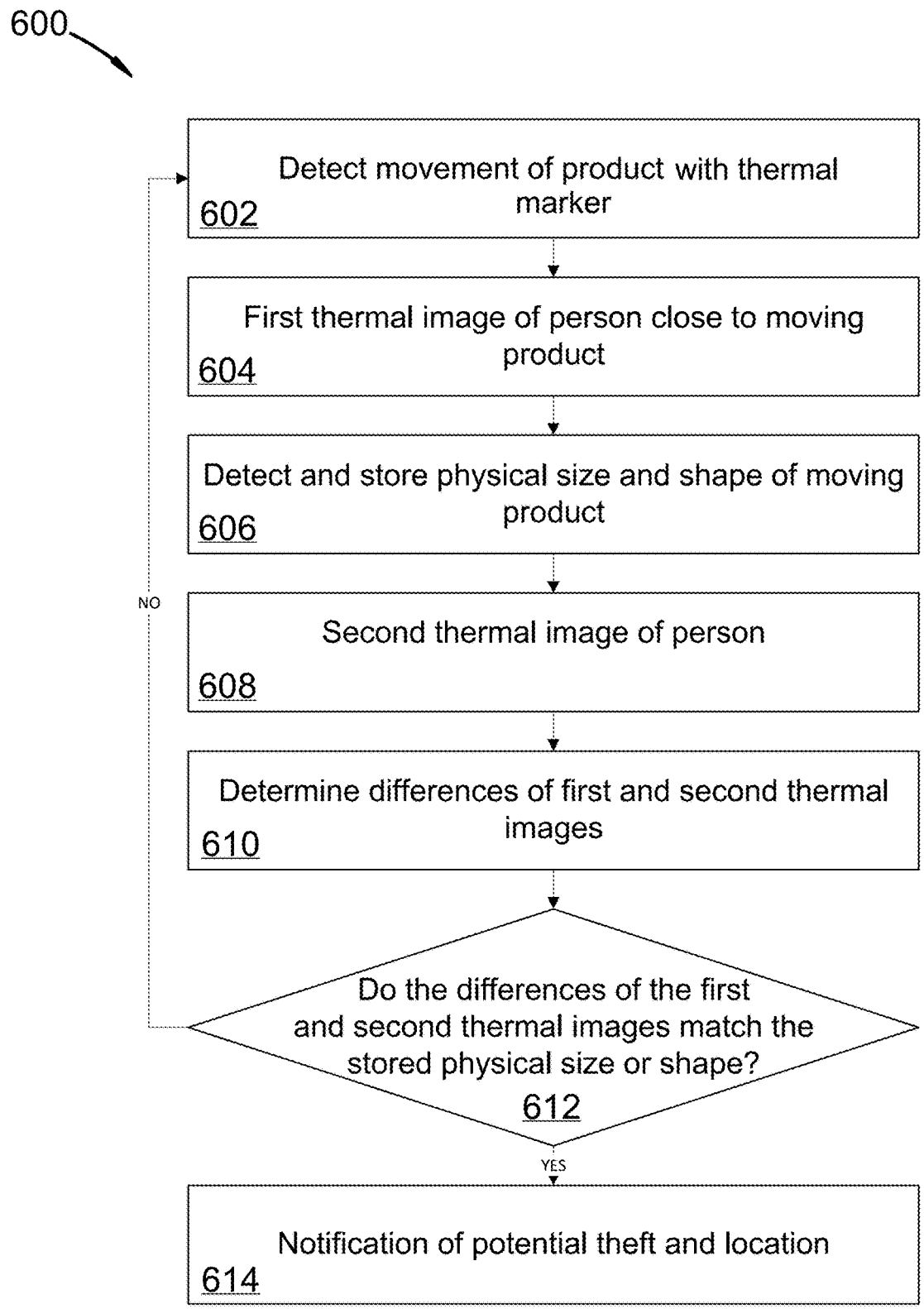
FIG. 6 shows a process flow chart in accordance with an embodiment of the invention.

FIG. 6 shows a process flow chart in accordance with an embodiment of the invention. shows a process flow chart in accordance with an embodiment of the invention. At step 602 a vision system detects a person moving a warehoused product with a thermal marker. One or more cameras take a first thermal image 604 of a body of a person handling or moving the warehoused product. A physical size and/or shape of the warehoused product is stored 606. A second thermal image is obtained subsequent or after the first thermal image is taken 608. A computer system with a program, performs digital image processing to determine differences in image intensities of the first and second thermal images 610. At step 612, a determination is made if the differences in the first thermal image compared to the second thermal image correlate to a stored physical size or shape of the product moved 612. If a match is found a notification of theft including a location and images to an electronic device. The electronic device may be an employee device, a store loud speaker, a shopping cart device, or a device of the person who is concealing the product 614.

Figure 7:
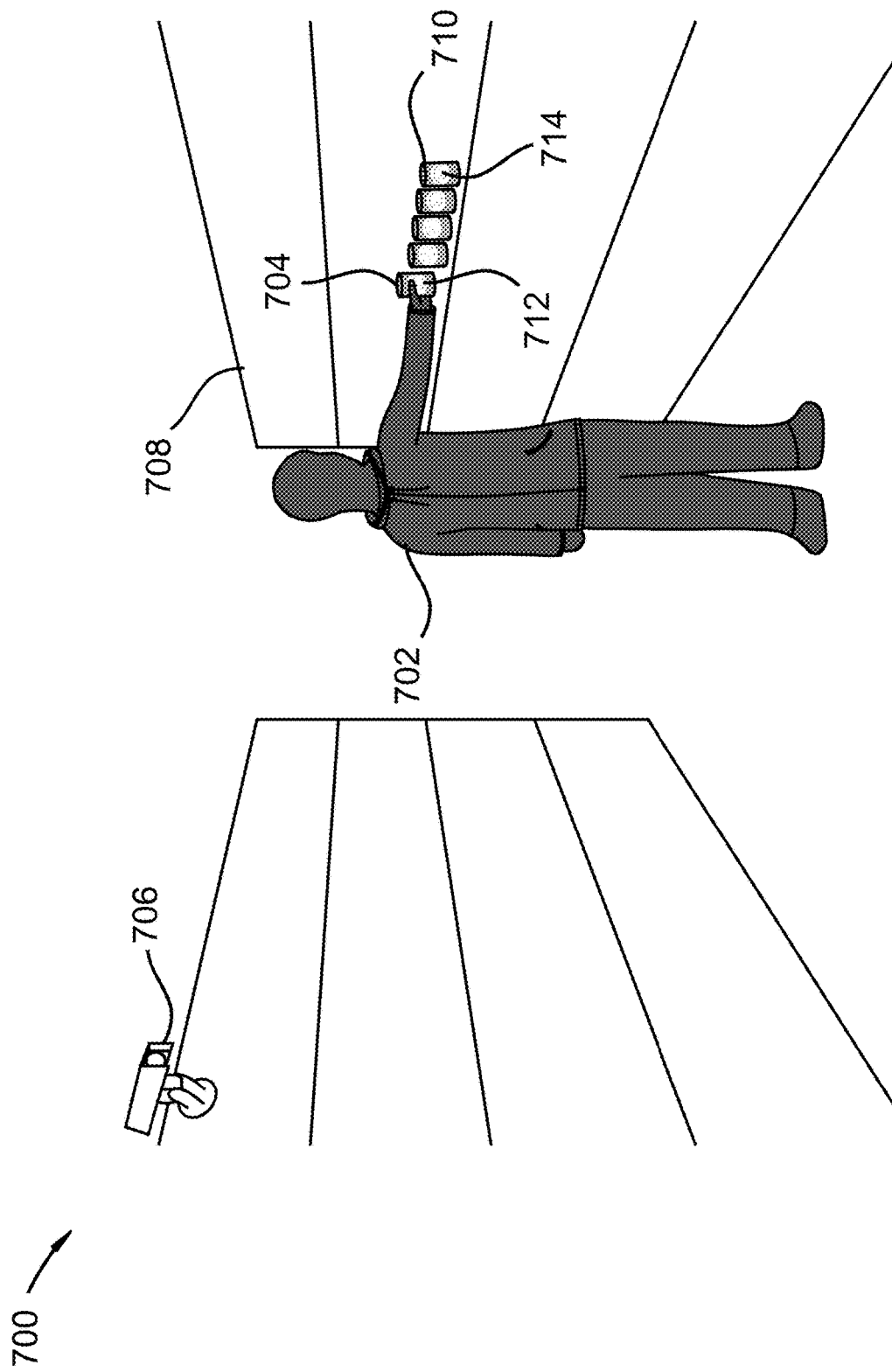
FIG. 7 shows a perspective view of a person holding a warehoused product in accordance with an embodiment of the invention.

FIG. 7 shows a perspective view 700 of a person holding a warehoused product 704/710 including thermal markers 712/714 in accordance with an embodiment of the invention. One or more store cameras 706 may track a customer/person 702 and determine that the customer/person 702 has removed a warehoused product 704 from an isle shelf 708 of a store or warehouse. Thermal markers 712/714 may enable one or more cameras 706 to detect movement of products 704/710. One or more cameras 706 may comprise one or more of: still image cameras, video cameras, thermographic cameras, infrared cameras, forward looking infrared cameras, motion sensors, or a combination thereof. One or more or the one or more cameras may employ thermal imaging in addition to poly chromatic images/video to track the customer and any items removed from a shelf. One or more thermal imaging cameras 706 may detect and discriminate a product's thermal image 704 (shown in light gray) using thermal markers 712/714 from a customer's thermal image 702 (shown in dark grey). Temperature differences between objects in a field-of-view of a thermographic camera appear with different colors or shades which directly correlate to the temperatures of the objects. Items with similar temperatures have similar colors or shading. A person, 702, shown has a relatively uniform temperature profile shown by the uniform grey coloring. Warehoused products 704/710, have a relatively uniform temperature profile but are at a different temperature (ambient) compared to customer/person 702 at or near body temperature. As person/customer 702 handles or moves warehoused product 704, one or more thermal cameras 706 may take one or more thermal images or may start taking thermal video frames. A movement of product 704 may be detected by one or more cameras 706 and trigger the one or more cameras to start taking thermal images or frames of a body of person 702 to obtain a first thermal image. One or more cameras 706 may be used as a motion sensor/detector or a motion sensor may be co-located with one or more cameras 706 and trigger thermal image capture of a body of person 702. Thermal markers may include thermally absorptive and thermally reflective materials as described in relation to FIG. 4.

Figure 8:
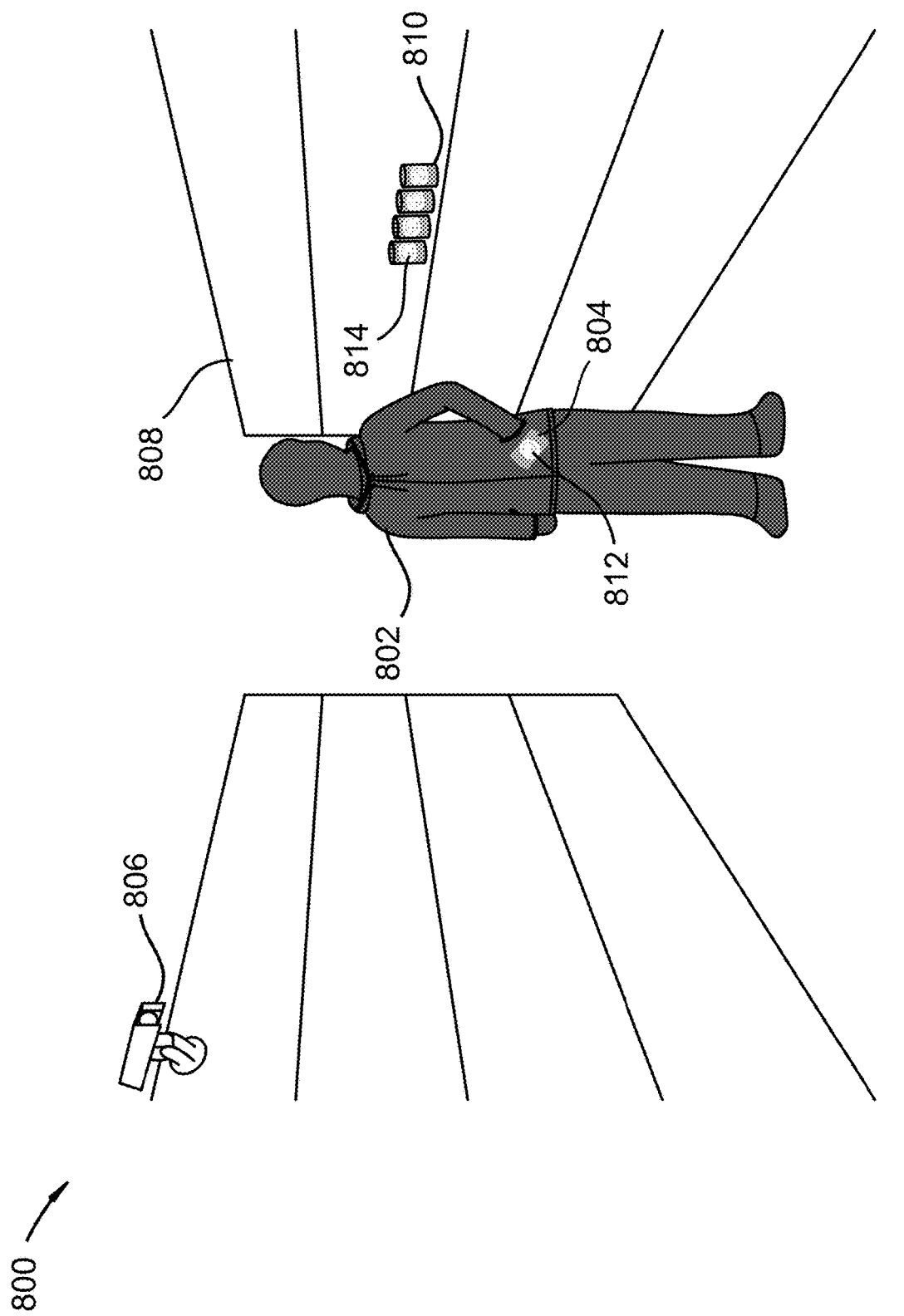
FIG. 8 shows a perspective view of a person pocketing a warehoused product in accordance with an embodiment of the invention.

FIG. 8 shows a perspective view 800 of a person pocketing a warehoused product in accordance with an embodiment of the invention. One or more cameras 806 which may include one or more camera systems, one or more computers, one or more wireless transmitters, one or more wireless receivers, one or more networks, may be used to detect a customer/person with pocketed product 804. Product 804 may include one or more products removed from a shelf or display 808 including products with a thermal marker 812/814. Thermal markers 812/814 may include machine readable indicia enabling vision system 806 to determine theft of a product in a pocket or under clothing of person 802. The one or more cameras 806 may employ thermal imaging in addition to poly chromatic images to track the customer and any items removed from a shelf. One or more cameras 806 may comprise one or more of: still image cameras, video cameras, thermographic cameras, infrared cameras, forward looking infrared cameras, motion sensors, or a combination thereof. One or more or the one or more cameras may employ thermal imaging in addition to poly chromatic images/video to track the customer and any items removed from a shelf. One or more thermal imaging cameras 806 may detect and discriminate a product's thermal image 804 (shown in light gray) from a customer's thermal image 802 (shown in dark grey). Temperature differences between objects in a field-of-view of a thermographic camera appear with different colors or shades which directly correlate to the temperatures of the objects. Items with similar temperatures have similar colors or shading. A person, 802, shown has a relatively uniform temperature profile shown by the uniform grey coloring except for the thermal image of the product 804 shown in light grey. Warehoused product 804, has a relatively uniform temperature profile but is at a different temperature (ambient) compared to customer/person 802 being at or near body temperature. A difference of two thermal images may reveal a product item that has been recently pocketed. A first thermal image of a body of person 802 shown in FIG. 7 as 702 may be taken as a product is handled or moved. At a subsequent time, a second thermal image is taken and compared to the first thermal image revealing a difference in intensity (shown in FIG. 9). A first thermal image is important because a product item brought in the store by the customer, such as a cold soda, may have been in their pocked before a pocketed item was placed in the same pocket. A comparison of a first thermal image to a second thermal image is also important to detect a potential theft. Obtaining a first and second thermal image at or near a time of pocketing a product is also important because of possible temperature equalization resulting in an undetectable thermal profile difference between products pocketed and a temperature of a person's body. The first and second thermal images may be taken within 30 seconds of a movement of a product item. As person/customer 802 handles or moves warehoused product 804, one or more thermal cameras 806 may take one or more thermal images or may start taking thermal video frames. A movement of product 804 may be detected by one or more cameras 806 and trigger the one or more cameras to start taking thermal images or frames of a body of person 802 in order to obtain a first thermal image. A second thermal image may be obtained by comparing a first thermal image to video frames or images taken after or subsequent to the first thermal images and detecting images intensity differences about, overlaid, or superimposed onto a body of a person handling the product. If an intensity difference if found, the two images may be chosen as a first and second thermal image. Both the first and second thermal images may be taken within a 30 second interval of each other. One or more cameras 806 may be used as a motion sensor/detector or a motion sensor may be co-located with one or more cameras 806 and trigger thermal image capture of a body of person 802. An image of the customer with a customer location superimposed in the image or connected to the image may be sent to an employee's mobile device by means of wired or wireless communications. The image may be sent by text message, by email, by instant messaging, or directly through a custom program application. The machine vision may track customer's movements in real-time while a customer moves inside of a store. The camera system 806 may use a defined camera location or a defined pixel grouping to determine a customer location identifier. One or more cameras 806 may be used and a camera may be assigned to a particular area, isle or region within a store. If only one camera is used, pixel groupings of a camera's optical sensor may be related to isles, regions, and/or areas of a store. Cameras may use thermal imaging in addition to optical image recognition. Machine vision may also identify the one or more items for purchase using barcodes, lettering, or dimensional constraints of a product. If a customer's location changes, an updated image may be sent to the employee with an updated location attached to the image. An employee may deliver a product transportation device, container, cart or basket to a customer's current location and ask the customer to "please use a product transportation container instead of your clothing to transport product to be purchased" as a method of preventing theft. A customer may be notified of an arrival of the product transportation device either by the employee, a text message, a display screen on the product transportation device, or by an audio store loud speaker broadcast.

Figure 9:
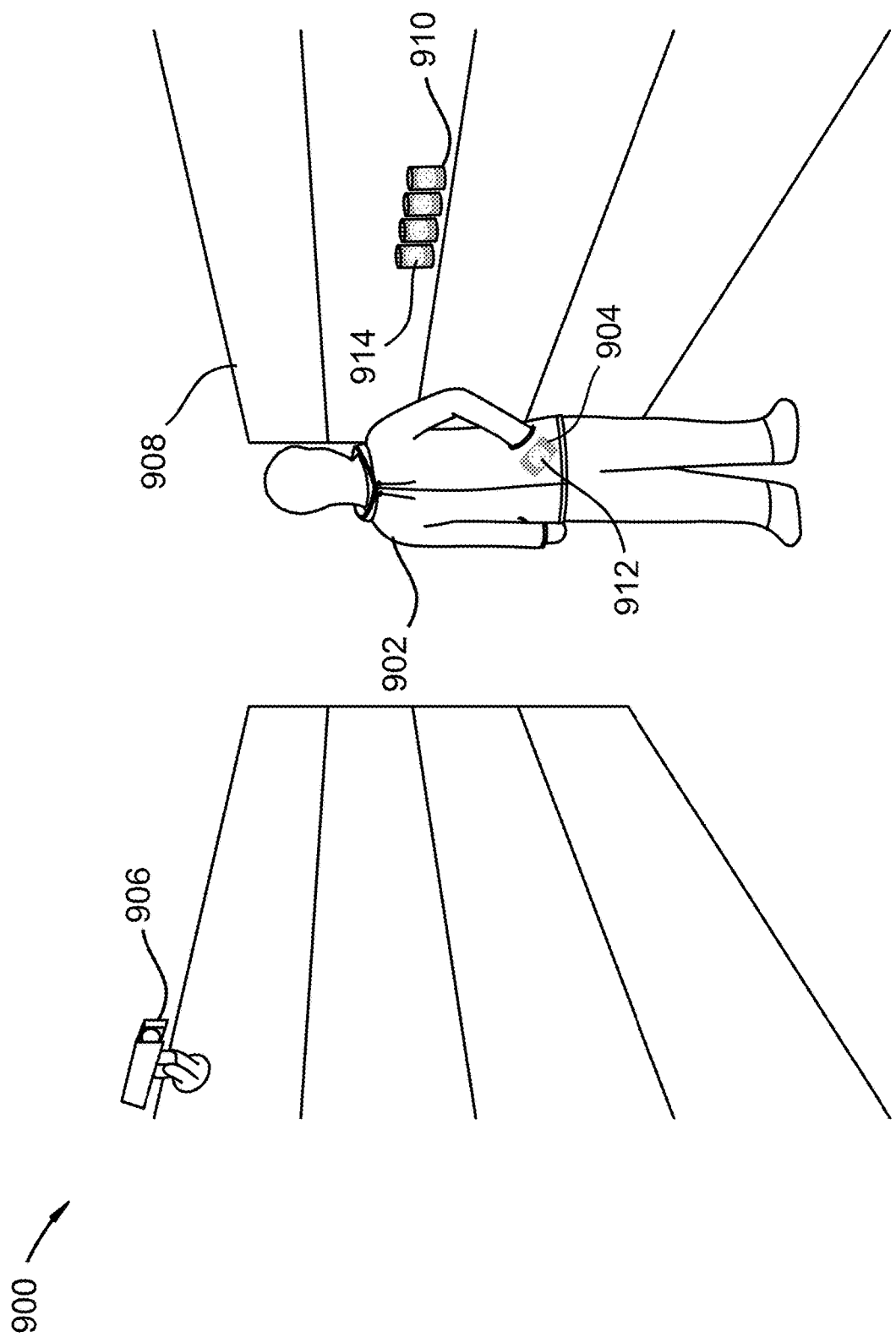
FIG. 9 shows a perspective view of intensity differences of a pocketed warehoused product in accordance with an embodiment of the invention.

FIG. 9 is a perspective view of intensity differences of a pocketed warehoused product in accordance with an embodiment of the invention. Digital signal processing has taken the thermal images of FIGS. 7 and 8 and found differences in intensity relating to a products size and or shape 904 and determined that a pocketed product matches a product just removed from shelf 908. Difference image 904/912 can be easily recognized by machine vision system/camera(s) 906, employing a subtraction routine, thus allowing a shape of the product to be seen and compared to a previously stored shape/size and/or image of the product.

Figure 10:
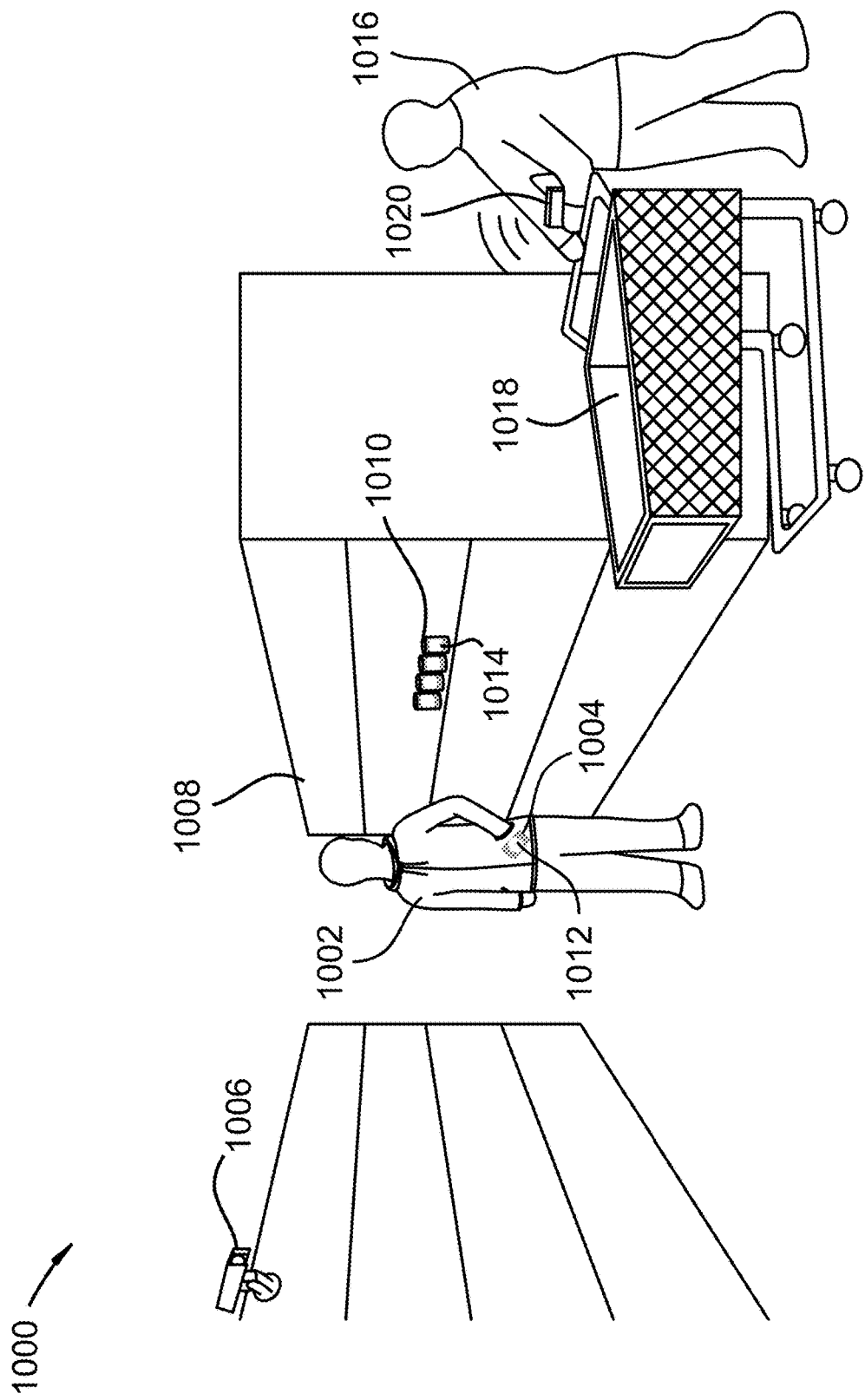
FIG. 10 shows a perspective view of intensity differences of a pocketed warehoused product and a potential theft notification in accordance with an embodiment of the invention.

FIG. 10 shows a perspective view of intensity differences of a pocketed warehoused product and a potential theft notification in accordance with an embodiment of the invention. After machine vision system/camera(s) 1006 determine potential theft of product 1004, a notification may be sent to an employee 1016 by wave of an employee device 1020. Employee device 1020 may include a mobile phone or barcode scanner or other portable electronic device. The notification may include one or more images of the person 1002, thermal images of the product under clothing of person 1002, and combinations thereof. One or more of the images may have a location of person 1002 superimposed over the image allowing employee 1016 to find person 1002 quickly. Employee 1016 may provide a shopping basket to person 1002 and ask the person to deposit the hidden items in the cart. In another embodiment, a notification may be sent directly to a mobile device associated with person 1002, such as a mobile phone or shopping cart with a mobile device attached. An image of the theft may be displayed to person 1002 and/or employee 1016 any mobile device of either party. An audible notification may be given to alert person 1002 to not carry unpurchased items under clothing.

The systems and methods disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of theft prevention comprising:
obtaining a first optical image;
identifying a warehoused product in the first optical image based on a physical size or shape of the warehoused product;
tracking movements of a person based at least in part on the first optical image;
detecting movement of the warehoused product by the person based at least in part on the first optical image;
obtaining a first thermal image while the person is handling or moving the warehoused product, wherein a body of the person has a first thermal intensity and the warehoused product has a third thermal intensity that is different than the first thermal intensity in the first thermal image;
selecting a second thermal image from a plurality of thermal images taken subsequent to the obtaining of the first thermal image, wherein the warehoused product intersects, overlaps, or covers a portion of the body of the person in the second thermal image, and wherein the second thermal image is selected by comparing thermal images from the plurality of thermal images until at least one of a fourth thermal intensity of the warehoused product changes with respect to the third thermal intensity of the warehoused product and a second thermal intensity of the person changes with respect to the first thermal intensity of the person; and
detecting a potential theft based on the change in thermal intensity between the first thermal intensity in the first thermal image and the second thermal intensity in the second thermal image or the change in thermal intensity between the third thermal intensity in the first thermal image and the second thermal intensity in the second thermal image.

2. The method of claim 1, wherein the first optical image, the first thermal image, and the second thermal image are captured using one or more cameras, and wherein the one or more cameras comprise one or more of: still image cameras, video cameras, thermographic cameras, infrared cameras, forward looking infrared cameras, motion sensors, or a combination thereof.

3. The method of claim 1, wherein a thermal marker is attached to the warehoused product.

4. The method of claim 1, further comprising, determining a location of the person, wherein a defined camera location or a defined pixel grouping of an optical sensor in a camera is used to determine the location of the person.

5. The method of claim 3, wherein the detecting movement is based, in part, on movement of the thermal marker attached to the warehoused product.

6. The method of claim 1, further comprising determining a type or kind of the warehoused product being moved.

7. The method of claim 6, wherein the type or kind is identified by a product barcode attached to the warehoused product.

8. The method of claim 3, wherein the thermal marker is a thermal barcode.

9. The method of claim 8, wherein the thermal barcode comprises machine readable thermal markings identifiable by a thermal camera, a standard camera, or a standard barcode reader.

10. The method of claim 6, further comprising storing of the physical size or shape of the warehoused product, wherein the storing of the physical size or shape of the warehoused product is a result of the identifying the type or kind of the warehoused product being moved.

11. The method of claim 1, further comprising storing of the physical size or shape of the warehoused product, wherein the storing of the physical size or shape of the warehoused product is a result of storing a digitized image of the warehoused product as the warehoused product is being moved.

12. The method of claim 1, wherein the obtaining a second thermal image of the person is between 2 seconds and 30 seconds after the first thermal image is obtained.

13. The method of claim 1, wherein the obtaining a second thermal image of the person is between 2 seconds and 30 seconds after movement of the warehoused product.

14. The method of claim 1, wherein the second thermal image is selectively chosen from a plurality of thermal images taken subsequent to the first thermal image.

15. The method of claim 2, wherein the location of the person is reported to a device of an employee associated with the warehoused product.

16. The method of claim 1, further comprising providing a notification to the person wherein providing the notification to the person is accomplished by a physical notification attached to a product transportation device.

17. The method of claim 1, further comprising providing a notification to the person wherein providing the notification to the person is accomplished by an employee, associated with the warehoused product, speaking to the person.

18. The method of claim 1, further comprising providing a notification to the person wherein providing the notification to the person is accomplished by sending a text message to a mobile device of the person.

19. The method of claim 14, wherein the second thermal image is selectively chosen by comparing frames of digital thermal images until at least one of the second thermal intensity of the warehoused product changes with respect to the first thermal intensity of the warehoused product and the second thermal intensity of the person changes with respect to the first thermal intensity of the person.

\* \* \* \* \*